(12) United States Patent
Kumar et al.

(10) Patent No.: US 9,719,000 B2
(45) Date of Patent: Aug. 1, 2017

(54) HOT MELT ADHESIVE AND METHOD OF FORMING THE SAME

(71) Applicant: BASF SE, Ludwigshafen (DE)

(72) Inventors: Rajesh Kumar, Riverview, MI (US); Nikolay Lebedinski, West Bloomfield, MI (US); Lyle Andrew Caillouette, Farmington, MI (US)

(73) Assignee: BASF SE, Ludwigshafen (DE)

( * ) Notice: Subject to any disclaimer, the term of this patent is extended or adjusted under 35 U.S.C. 154(b) by 43 days.

(21) Appl. No.: 14/771,987

(22) PCT Filed: Mar. 4, 2014

(86) PCT No.: PCT/US2014/020294
§ 371 (c)(1),
(2) Date: Sep. 1, 2015

(87) PCT Pub. No.: WO2014/158809
PCT Pub. Date: Oct. 2, 2014

(65) Prior Publication Data
US 2016/0009969 A1    Jan. 14, 2016

Related U.S. Application Data

(60) Provisional application No. 61/781,204, filed on Mar. 14, 2013.

(51) Int. Cl.
| | |
|---|---|
| C09J 175/06 | (2006.01) |
| B32B 21/00 | (2006.01) |
| B32B 15/00 | (2006.01) |
| B32B 7/12 | (2006.01) |
| C08G 18/62 | (2006.01) |
| C08G 18/76 | (2006.01) |
| C08G 18/40 | (2006.01) |
| C09J 175/16 | (2006.01) |

(52) U.S. Cl.
CPC ............ *C09J 175/06* (2013.01); *B32B 7/12* (2013.01); *B32B 15/00* (2013.01); *B32B 21/00* (2013.01); *C08G 18/4063* (2013.01); *C08G 18/6245* (2013.01); *C08G 18/7671* (2013.01); *C09J 175/16* (2013.01)

(58) Field of Classification Search
CPC ............ C08G 18/4063; C08G 18/6245; C08G 18/7671; C09J 175/06; C09J 175/16; B32B 15/00; B32B 21/00; B32B 7/12

USPC .... 428/423.1, 425.1, 425.8, 425.9; 526/935; 528/59
See application file for complete search history.

(56) References Cited

U.S. PATENT DOCUMENTS

| | | | |
|---|---|---|---|
| 4,618,390 A | 10/1986 | Powell | |
| 4,999,407 A | 3/1991 | Gilch et al. | |
| 5,018,337 A | 5/1991 | Carter et al. | |
| 5,021,507 A | 6/1991 | Stanley et al. | |
| 5,866,656 A | 2/1999 | Hung et al. | |
| 6,387,449 B1* | 5/2002 | Reid | C08G 18/12 156/320 |
| 6,482,878 B1 | 11/2002 | Chu | |
| 6,613,836 B2 | 9/2003 | Rumack | |
| 8,680,205 B2 | 3/2014 | Brinkman et al. | |
| 2002/0164486 A1* | 11/2002 | Guse | C08G 18/12 428/423.1 |
| 2003/0022973 A1* | 1/2003 | Hung | C08G 18/12 524/270 |
| 2007/0155859 A1* | 7/2007 | Song | C08G 18/10 523/218 |
| 2008/0312361 A1* | 12/2008 | Wintermantel | C08G 18/10 524/147 |

FOREIGN PATENT DOCUMENTS

| | | |
|---|---|---|
| EP | 0 128 231 A1 | 12/1984 |
| EP | 0 561 103 A1 | 9/1993 |
| EP | 0 598 335 A2 | 5/1994 |
| EP | 1 770 138 A1 | 4/2007 |
| EP | 2 546 274 A1 | 1/2013 |
| WO | WO 03/006522 A1 | 1/2003 |

OTHER PUBLICATIONS

International Search Report for Application No. PCT/US2014/020294 dated Jun. 6, 2014, 3 pages.

* cited by examiner

*Primary Examiner* — Thao T Tran
(74) *Attorney, Agent, or Firm* — Howard & Howard Attorneys PLLC

(57) ABSTRACT

A hot melt adhesive (HMA), which is solid at room temperature, comprises the reaction product of 5 to 25% by weight of an isocyanate component having an NCO content of from about 20 to about 50% by weight, 75 to 85% by weight of a polyester, and 1 to 10% by weight of a hydroxy-polymer having an OH number of from about 40 to about 50. A method of forming the adhesive comprises the step of combining the isocyanate component, polyester, and hydroxy-polymer to form the adhesive. The adhesive can be used for various purposes, such as for forming an adhesive layer which adhesively couples surfaces together.

19 Claims, No Drawings

HOT MELT ADHESIVE AND METHOD OF FORMING THE SAME

RELATED APPLICATIONS

This application is the National Stage of International Patent Application No. PCT/US2014/020294, filed on Mar. 4, 2014, which claims priority to and all the advantages of U.S. Patent Application No. 61/781,204, filed on Mar. 14, 2013, the content of which is incorporated herein by reference.

FIELD OF THE INVENTION

The present invention generally relates to a hot melt adhesive, and more specifically to a hot melt adhesive comprising an isocyanate component, a polyester, and a hydroxy-polymer and to a method of forming the hot melt adhesive.

DESCRIPTION OF THE RELATED ART

Hot melt adhesives (or "HMAs") are generally 100% solid materials at room temperature which do not contain or require any solvent(s). On application of heat, HMAs melt to a liquid/fluid state in which form they are applied to one or more substrates. Upon cooling, the HMA regains its prior solid form and gains its cohesive strength. HMAs which are applied in molten form and cool to solidify and subsequently cure by a chemical crosslinking reaction have been prepared using specific materials such as polyurethanes.

Polyurethane (PUR) adhesives are generally available as cold curing two-component (2-K) PUR systems, hot curing one-component (1-K) PUR systems, moisture curing 1-K PUR systems, and reactive 1-K PUR hot melts. Moisture cure 1-K systems cure through a polycondensation reaction which takes place as a first step of the curing process and an addition reaction which takes place in a second step of the curing process. Reactive 1-K PUR hot melts cure through a combination of an initial physical cure and a secondary chemical crosslinking. The secondary chemical crosslinking can be initiated by heat, moisture, or both heat and moisture. Upon cooling, there is a rapid development of initial bond (or "green") strength, meaning that substrates can be rapidly affixed for further processing. Final strength is reached later after conclusion of chemical crosslinking. Systems in which moisture initiates the crosslinking consist of high molecular weight, "meltable" polyurethanes with terminal isocyanate groups that react when exposed to moisture.

It is known that incorporation of low molecular weight polymers formed from ethylenically unsaturated monomers containing no reactive hydrogen into otherwise conventional polyurethane HMAs provides an improvement with respect to cohesive and adhesive strength and assists in developing adhesive forces with some of the traditionally difficult to adhere to substrates. In order to incorporate the low molecular weight polymer into the 1-K PUR hot melt, it is possible to polymerize the respective monomers in the presence of a urethane prepolymer or, optionally, to blend a prepolymerized low molecular weight polymer which contains the ethylenically unsaturated monomers containing no reactive hydrogen with the urethane prepolymer.

While the class of adhesives described above has improved properties for most applications, the fact that the low molecular weight polymer is merely blended into, and not chemically bound, within the urethane, still creates problems in areas where high heat and/or solvent resistance is required such as for automotive adhesive and sealant applications. Moreover, the range of monomers useful is somewhat limited in terms of glass transition temperature (Tg), which plays a significant role in open time, green strength, and development of cohesive strength of the HMAs. Additionally, many of the conventional polyurethane HMAs include polymerized low molecular weight polymers which lack stability in regard to components having active hydrogen. There is a need for HMAs which are stable, utilize low Tg materials to improve the adhesion to certain substrates, and provide for longer open time. Accordingly, there remains an opportunity to provide improved HMAs as well as an opportunity to provide methods of forming improved HMAs.

SUMMARY OF THE INVENTION AND ADVANTAGES

Disclosed is a hot melt adhesive. The hot melt adhesive is solid at room temperature. The hot melt adhesive comprises the reaction product of 5 to 25% by weight of an isocyanate component, 75 to 85% by weight of a polyester, and 1 to 10% by weight of a hydroxy-polymer. The isocyanate component has an NCO content of from about 20 to about 50% by weight. The hydroxy-polymer has an OH number of from about 40 to about 50.

Also disclosed is an article. The article comprises a first surface, a second surface disposed adjacent the first surface, and an adhesive layer disposed between the first and second surfaces. The first and second surfaces are adhesively coupled by the adhesive layer. The adhesive layer is formed from the hot melt adhesive.

Also disclosed is a method of forming the hot melt adhesive. The method comprises the steps of providing the isocyanate component, providing the polyester, and providing the hydroxy-polymer. The method further comprises the step of combining the isocyanate component, the polyester, and the hydroxy-polymer to form the hot melt adhesive.

The hot melt adhesive of this disclosure generally exhibits excellent physical and/or chemical properties, such as lower application temperatures relative to conventional hot melts, low or no volatile organic compounds (e.g. solvents), no mixing requirement, variable open time, immediate green strength and fast development of cohesive strength, improved resistance to high temperature, improved resistance to moisture and solvents, improved adhesion to substrates, improved creep resistance, excellent tensile strengths and elongation at break, and combinations thereof. The hot melt adhesive is useful for sticking various objects and/or materials together.

DETAILED DESCRIPTION OF THE INVENTION

Disclosed is a hot melt adhesive. Also disclosed is a method of forming the hot melt adhesive. Yet also disclosed is an article comprising an adhesive layer formed from the hot melt adhesive. The hot melt adhesive (or "HMA"), may simply be referred to as the "adhesive" hereinafter, and is described below. The article and method are described further below.

The adhesive comprises the reaction product of an isocyanate component, a polyester, and a hydroxy-polymer. In this way, all three of these components are chemically reacted/bound, rather than merely physically combined, to form the adhesive. In further embodiments, the adhesive consists essentially of the reaction product of the isocyanate component, polyester, and hydroxy-polymer. In yet further embodiments, the adhesive consists of the reaction product of the isocyanate component, polyester, and hydroxy-polymer. In certain embodiments, the adhesive may comprise one or more additional components, such as a catalyst component for facilitating cure of the adhesive. These optional components are described further below.

Referring to the isocyanate component, various types of isocyanates can be utilized to form the adhesive. The isocyanate component typically has at least two isocyanate functional (NCO) groups. The NCO groups are reactive with each of the polyester and hydroxy-polymer under reaction conditions. Reaction of the various components is described further below. The isocyanate component may commonly be referred to in the art as a diisocyanate (i.e., an isocyanate having two NCO groups) or a polyisocyanate (i.e., an isocyanate having three or more NCO groups).

Examples of suitable isocyanates for use as (or in) the isocyanate component include conventional aliphatic, cycloaliphatic, araliphatic and aromatic isocyanates. In certain embodiments, the isocyanate component is selected from the group of diphenylmethane diisocyanates (MDIs), polymeric diphenylmethane diisocyanates (PMDIs), and combinations thereof. In specific embodiments, the isocyanate component is MDI, e.g. 4,4'-MDI. In some of these embodiments, the isocyanate component may include a residual amount of 2,4'-MDI. Polymeric diphenylmethane diisocyanates are also referred to in the art as polymethylene polyphenylene polyisocyanates. Other examples of suitable isocyanates include, but are not limited to, toluene diisocyanates (TDIs), hexamethylene diisocyanates (HDIs), isophorone diisocyanates (IPDIs), naphthalene diisocyanates (NDIs), and combinations thereof.

In certain embodiments, the isocyanate component is an isocyanate-terminated prepolymer. The isocyanate-terminated prepolymer is a reaction product of an isocyanate and a polyol and/or a polyamine, as understood in the polyurethane art. The isocyanate may be any type of isocyanate known to those skilled in the polyurethane art, such as one of the isocyanates described above, e.g. MDI. If utilized to make the isocyanate-terminated prepolymer, the polyol is typically selected from the group of ethylene glycol, diethylene glycol, propylene glycol, dipropylene glycol, butane diol, glycerol, trimethylolpropane, triethanolamine, pentaerythritol, sorbitol, and combinations thereof. If utilized to make the isocyanate-terminated prepolymer, the polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. The isocyanate-terminated prepolymer may also be formed from a combination of two or more of the aforementioned polyols and/or polyamines. The isocyanate component may also be a modified isocyanate, such as/with carbodiimides, allophanates, isocyanurates, and biurets.

Specific examples of suitable isocyanate components are commercially available from BASF Corporation of Florham Park, N.J., under the trademark LUPRANATE®, such as LUPRANATE® M, LUPRANATE® MI, LUPRANATE® M20, LUPRANATE® M20SB, LUPRANATE® M20HB, LUPRANATE® M20FB, LUPRANATE® MM103, LUPRANATE® M70L, LUPRANATE® M70LS, and LUPRANATE® M70R, isocyanates. The isocyanate component may include any combination of two or more of the aforementioned isocyanates.

The isocyanate component can be of various forms, such as a solid, a semi-solid, or a liquid. In various embodiments, the isocyanate component is a solid (e.g. at room temperature). The isocyanate component typically has a nominal functionality of from 2 to 5, 2 to 4, 2 to 3, or 2, or any subrange between the lowest and highest of these values. Typically, the isocyanate component has an NCO content of from about 20% to about 50%, about 25% to about 45%, about 30% to about 40%, about 30% to about 35%, or about 33%, or any subrange between the lowest and highest of these values. If an isocyanate-terminated prepolymer is utilized as the isocyanate component, the NCO content will generally be lower, if not much lower, than the values descried immediately above, e.g. less than 10%, less than 5%, etc., NCO content. The actual NCO content will depend on the extent that the prepolymer is pre-reacted, e.g. the extent which the original NCO content of the isocyanate is reacted with a polyol and/or polyamine.

The isocyanate component can be utilized in various amounts to form the adhesive. Typically, the isocyanate component is utilized in an amount of from about 5 to about 25, about 5 about 20, about 5 to about 15, about 10 to about 15, or about 12, % by weight, each based on the total weight of the adhesive, or any subrange between the lowest and highest of these values.

Referring to the polyester, various types of polyesters can be utilized to form the adhesive. In various embodiments, the polyester comprises an aliphatic polyester, a semi-aromatic polyester, an aromatic polyester, or combinations thereof. Examples of such polyesters include, but are not limited to, polyglycolide acids, polylactic acids, polycaprolactones, polyethylene adipates, polyhydroxyalkanoates, polyhydroxybutyrates, polyethylene terephthalates, polybutylene terephthalates, polytrimethylene terephthalates, and polyethylene naphthalates.

Further examples of suitable polyesters include polyester polyols and difunctional polyesters, such as 1,6 hexanediol adipates. Yet further examples include adipate polyester polyols, such as glycol adipate polyester polyols. Yet further examples still, include esters produced by esterifying phthalic acid or phthalic acid anhydride with an aliphatic polyhydric alcohol. Another class of aromatic polyester polyols which comprise esters produced by digesting dimethyl terephalate with a diol, triol or higher alcohol.

Specific examples of suitable polyesters are commercially available from Polyurethane Corporation of America of Lyndhurst, N.J., under the trade name Millester, such as the Millester 16 family of difunctional polyesters including Millester 16-35, Millester 16-30, Millester 16-30D, Millester 16-55, Millester 16-80, Millester 16-110, and Millester 16-160; from COIM Group of West Deptford, N.J., under the trade name Diexter, such as the Diexter-G family of glycol adipate polyester polymers including Diexter-G 60-30 and Diexter-G 1100-37; from Evonik Industries of Piscataway, N.J., under the trademark DYNACOLL®, including the DYNACOLL® 7000 series, e.g. DYNACOLL® 7360 and DYNACOLL® 7380; from BASF under the trademark LUPRAPHEN®; and from Stepan Company of Millsdale, Ill. under the trademark STEPANPOL®.

The polyester can be of various forms, such as a solid, a semi-solid, or a liquid. In various embodiments, the polyester is a solid (e.g. at room temperature). The polyester typically has a nominal functionality of from 2 to 5, 2 to 4, 2 to 3, or 2, or any subrange between the lowest and highest of these values. Typically, the polyester has a hydroxyl number of from about 20 to 200, about 25 to about 150, about 25 to about 100, about 25 to about 75, about 25 to about 50, about 25 to about 40, about 30 about 40, about 30 to about 35, about 35 to about 40, or about 25 to about 35, or any subrange between the lowest and highest of these values.

The polyester can be of various molecular weights. Typically, the polyester has a number average molecular weight (Mn) of less than about 4,000, of from about 500 to about 4,000, about 1,000 to about 4,000, about 1,500 to about 4,000, about 2,000 to about 4,000, about 3,000 to about 4,000, about 3,500 to about 4,000, or about 3,750, or any subrange between the lowest and highest of these values.

The polyester can be utilized in various amounts to form the adhesive. Typically, the polyester is utilized in an amount of from about 75 to about 85, about 76 about 84, about 77 to about 83, about 78 to about 82, about 79 to about 81, or about 80, % by weight, each based on the total weight of the adhesive, or any subrange between the lowest and highest of these values.

Referring to the hydroxy-polymer, various types of polymers having hydroxyl (OH) functionality can be utilized to form the adhesive. The hydroxy-polymer comprises the reaction product of monomers, typically the reaction product of a combination of different monomers.

Various ethylenically unsaturated monomers containing hydroxyl functionality greater than one may be utilized to form the hydroxy-polymer. In various embodiments, hydroxyl substituted C1 to C12 esters of acrylic and methacrylic acids including, but not limited to, hydroxyl substituted methyl acrylate, ethyl acrylate, n-butyl acrylate, 2-ethylhexyl acrylate, isobutyl acrylate, n-propyl or iso-propyl acrylate, or the corresponding methacrylates, are utilized. Mixtures of compatible (meth)acrylate monomers may also be used. Additional monomers that may be used include the hydroxyl substituted vinyl esters (vinyl acetate and vinyl propionate), vinyl ethers, fumarates, maleates, styrene, acrylonitrile, etc., as well as co-monomers thereof.

In various embodiments, the hydroxy-polymer comprises the reaction product of a combination of monomers comprising at least one styrene monomer and at least one acrylate monomer. In further embodiments, the combination of monomers further comprises at least one hydroxyethylacrylate monomer different from the at least one acrylate monomer. Therefore, in some of these embodiments, the hydroxy-polymer comprises the reaction product of styrene, acrylate, and hydroxyethylacrylate, monomers. In specific embodiments, the hydroxyl-polymer may be referred to as a hydroxyl functional acrylic polyol. Specific examples of suitable hydroxy-polymer are commercially available from BASF Corporation under the trademark JONCRYL®, such as JONCRYL® 580, JONCRYL® 581, JONCRYL® 587, and JONCRYL® 804, acrylic resin.

The hydroxy-polymer can be of various forms, such as a solid, a semi-solid, or a liquid. In various embodiments, the hydroxy-polymer is a solid (e.g. at room temperature). The hydroxy-polymer typically has a nominal functionality of from 2 to 20, 5 to 15, 7 to 12, or 9 to 10, or any subrange between the lowest and highest of these values. Typically, the hydroxy-polymer has a hydroxyl number of from about 40 to about 200, about 40 to about 175, about 40 to about 150, about 40 to about 125, about 40 to about 100, about 40 to about 75, 40 to 50, about 41 to about 49, about 42 to about 48, about 43 to about 47, about 44 to about 46, or about 45, or any subrange between the lowest and highest of these values. The hydroxy-polymer can have a wide range of glass transition temperature (Tg) values, typically a Tg of from about 60° to 80°, 65° to 75°, or 70°, C, or any subrange between the lowest and highest of these values.

The hydroxy-polymer can be of various molecular weights. Typically, the hydroxy-polymer has a number average molecular weight (Mn) of less than about 15,000, less than about 12,500, less than about 10,000, less than about 7,500, less than about 5,000, less than about 4,000, or of from about 500 to about 15,000, about 500 to about 12,500, about 500 to about 10,000, about 500 to about 7,500, about 500 to about 5,000, about 500 to about 4,000, about 1,000 to about 4,000, about 1,500 to about 4,000, about 2,000 to about 4,000, about 3,000 to about 4,000, about 3,500 to about 4,000, or about 3,500 to about 3,750, or any subrange between the lowest and highest of these values.

The hydroxy-polymer can be utilized in various amounts to form the adhesive. Typically, the hydroxy-polymer is utilized in an amount of from about 1 to about 10, about 2 about 9, about 3 to about 8, about 4 to about 7, about 5 to about 7, about 6 to about 7, or about 7, % by weight, each based on the total weight of the adhesive, or any subrange between the lowest and highest of these values.

In various embodiments, and further to the amounts described above with respect to the polyester and hydroxyl-polymer components (i.e., the hydroxyl functional components), the hydroxy-polymer and the polyester are reacted in a weight ratio of from about 1:10 to about 1:40, about 1:10 to about 1:20, about 1:10 to about 1:19, about 1:10 to about 1:18; about 1:10 to about 1:15, about 1:11 to about 1:14, about 1:11 to about 1:13; or about 1:11 to about 1:12, parts by weight, each based on 100 parts by weight of the hot melt adhesive, or any subrange between the lowest and highest of these values. It is to be appreciated that these components are reacted with the isocyanate component, rather than each other. These ratios can be useful for imparting physical properties to the adhesive, including crystallinity and solidification properties useful for hot melt adhesive applications. In various embodiments, the adhesive may also be referred to in the art as a 1-K hot melt, or more specifically as a 1-K PUR hot melt.

While the adhesive may be used directly as described above, if desired, the adhesive may also be formulated with conventional additives such as plasticizers, non-reactive acrylates (i.e., those that don't react with the isocyanate component), tackifiers, catalysts, fillers, anti-oxidants, pigments, mercapto/silane adhesion promoters, flow modifiers, leveling agents, stabilizers, and the like. This disclosure is not limited to any particular type or amount of additive.

After reaction of the isocyanate component, polyester, and hydroxyl-polymer to form the adhesive, the adhesive typically has a residual NCO group content of from about 1 to about 5, about 1.5 to about 2.5, or about 2, % by weight, or any subrange between the lowest and highest of these values. The residual NCO group content is useful for eventual moisture cure of the adhesive after application, as understood in the art.

The adhesive typically has excellent instant green strength after cooling. Green strength is understood in the art, and generally means that an article and/or surface utilizing an adhesive can be handled, moved, further processed, etc., prior to the adhesive reaching a final cure state. An "excellent" instant green strength typically means that such a property is imparted in a small (to very small) amount of time (e.g. within seconds or less), whereas a "poor" green strength typically means that such a property is imparted after a large (to very large) amount of time (e.g. tens of seconds if not minutes or more). A simplified example of this property can be appreciated by comparing Super Glue to Elmer's® Glue, where the former is quick to bond (e.g. skin) and the latter takes a much longer amount of time to bond.

Various methods can be utilized to determine green strength of the adhesive. One example of a test which may be used is ASTM D905 (or a modification thereof).

The adhesive typically has a tensile strength of from about 1,500 to about 4,000, about 1,750 to about 3,750, or about 2,000 to about 3,500, pounds per square inch (psi) (or from about 10 to about 28, about 12 to about 26, or about 14 to about 24, megapascals (MPa)), or any subrange between the lowest and highest of these values. The adhesive typically has an elongation at break of from about 250 to about 750, about 260 to about 750, about 270 to about 750, about 280 to about 750, or about 290 to about 740, %, or any subrange between the lowest and highest of these values. Various methods can be utilized to determine these properties of the adhesive. Examples of suitable methods/apparatuses include those commercially available from Instron of Norwood, Mass. under the trademark of INSTRON®, such as an INSTRON® Model 4505; and from MTS Systems Corporation of Eden Prairie, Minn., such as a MTS Sintech 2/S; as well as methods/apparatuses that use dynamic mechanical spectroscopy (DMS).

Referring to the method of this disclosure, the method comprises the steps of providing the isocyanate component, providing the polyester, and providing the hydroxy-polymer. Each of the components can be provided in various manners. The method further comprises the step of combining the isocyanate component, polyester, and hydroxy-polymer to form the adhesive. The components can be combined in any order. In certain embodiments, the hydroxy-polymer and polyester are combined in the weight ratio(s) as described above.

In various embodiments, the method further comprises the step of heating the polyester and isocyanate component until molten prior to the step of combining. This is especially useful when the components are in solid (or semi-solid) form.

Typically, the method further comprises the step of providing a reaction vessel. In these embodiments, the step of combining is further defined as disposing the isocyanate component, polyester, and hydroxy-polymer in the reaction vessel to form the adhesive. The components can be mixed to facilitate homogeneity and reaction. In certain embodiments, the vessel is maintained at a temperature of from about 100° to about 130°, about 115° to about 125°, or about 120°, C, or any subrange between the lowest and highest of these values. The vessel can be held at the aforementioned temperature for about 30 to about 180, about 45 to about 165, about 60 to about 140, about 80 to about 120, about 100 to about 120, or about 120, minutes, or any subrange between the lowest and highest of these values.

In certain embodiments, the isocyanate component and hydroxy-polymer are reacted in the vessel for a period of time to form a reaction intermediary prior to introducing the polyester to the vessel. In other embodiments, the isocyanate component and polyester are reacted in the vessel for a period of time to form a reaction intermediary prior to introducing the hydroxy-polymer to the vessel. In yet other embodiments, two different reaction intermediaries are first separately formed according to the two embodiments described immediately above, and then the two different reaction intermediaries are combined to form the adhesive. In alternate embodiments, the polyester and hydroxy-polymer are combined separate from the isocyanate component to form a mixture, and then the mixture and isocyanate component are combined to form the adhesive. In certain embodiments, a reaction intermediary can be formed as like above, and then separated/isolated much like a prepolymer, and then combined with an additional amount of the isocyanate component, polyester, and/or hydroxyl-polymer to form the adhesive. These embodiments are useful for altering the resulting structure, e.g. crystallinity, of the adhesive.

Said another way, the adhesive may be formed by reacting a mixture of the polyester, hydroxyl-polymer, and isocyanate component in a suitable vessel. Alternatively, the adhesive may be prepared by reacting each of the polyester and hydroxyl-polymer separately with the isocyanate component and blending the resultant prepolymers. Still further, the adhesive may be prepared by forming one prepolymer and subsequently forming the other prepolymer or prepolymers in the first.

In various embodiments, an inert atmosphere is established in the reactor, e.g. a nitrogen and/or argon blanket, to prevent premature moisture cure of the adhesive during formation. A similar blanket can also be use for storage and/shipment of the adhesive, e.g. while transported/stored in drums.

The resulting adhesive, as described herein above, can be utilized for various applications. Typically, the adhesive is used to adhesively couple two or more surfaces. The adhesive is typically solid at room temperature (or "RT"). RT is generally understood in the art, and is typically at or about 23±3° C. The adhesive is typically applied at temperatures of at least about 90° C., at least about 100° C., at least about 110° C., at least about 120° C., at least about 130° C., or typically of from about 120° C. to approaching the degradation temperature of the adhesive (which can be determined via routine experimentation), more typically of from about 120° to about 150°, about 120° to about 140°, about 120° to about 130°, or about 120° to about 125°, C, or any subrange between the lowest and highest of these values.

At the (application) temperatures described immediately above, the adhesive is generally in a fluid state and has a melt viscosity of from about 2,500 to about 75,000, about 3,000 to about 70,000, about 5,000 to about 50,000, about 10,000 to about 45,000, about 15,000 about 40,000, about 17,500 to about 40,000, about 20,000 to about 40,000, about 20,000 to about 35,000, about 20,000 to about 30,000, or about 25,000, centipoises (cps) at 120° C., or any subrange between the lowest and highest of these values.

It is to be appreciated that the melt viscosities described immediately above can be higher or lower depending on the temperature at which they are measured. For example, the melt viscosity will generally increase as temperature decreases and vice versa. It is thought that the melt viscosity of the adhesive is useful for providing excellent instant green strength. Specifically, without being bound or limited by any particular theory, it is thought that the particular combination of components utilized to form the adhesive provides an excellent combination of desirable adhesive properties, including green strength, melt viscosity, tensile strength, and/or elongation at break. Further, it is thought that the adhesive has an excellent combination of desirable melt viscosity at application temperature (e.g. 120° C.) while still being flowable at lower temperature (upon cooling) to give intimate contact (e.g. surface wetting) with the substrates to be adhered. In addition, based on the chemical makeup of the adhesive, the adhesive can cool quickly relative to conventional hot melts (e.g. those including fillers), which helps to provide the instant green strength previously described above.

The adhesive can be applied by various means understood in the art, such as my extruding, rolling, pouring, spraying, brushing, daubing, smearing, dipping, sheeting, etc. After application, the adhesive develops green strength while cooling (i.e., while re-solidifying), then the adhesive moisture cures over time based on the residual NCO content, thereby forming internal cross-links and setting the adhesive into a final cure state over time.

Referring to the article, the article comprises a first surface and a second surface disposed adjacent the first surface. An adhesive layer is disposed between the first and second surfaces such that the first and second surfaces are adhesively coupled by the adhesive layer. The adhesive layer is formed from the adhesive. Specifically, the adhesive layer comprises the reaction product of the adhesive and water. Prior to application of the adhesive, the surfaces may be clean or dirty (e.g. oily), and can comprise various materials. Each of the first and second surfaces can individually comprise metal, wood (i.e., a lignocellulosic material), plastic, composites, or combinations thereof. The adhesive can be applied to one or both of the surfaces.

The following examples, illustrating the adhesive and method of the present invention, are intended to illustrate and not to limit the invention.

EXAMPLES

Examples 1 and 2 illustrated in Table 1 below are adhesives formed in accordance with the instant disclosure. Each of the components of the examples is provided in percent by weight based on the total weight of the corresponding adhesive. A '–' symbol in the tables below means that the respective component was not utilized or that the respective property was not recorded or determined.

TABLE 1

| Component | Example | | | | | |
|---|---|---|---|---|---|---|
| | 1 | 2 | 3 | 4 | 5 | 6 |
| Isocyanate | 13.19 | 13.22 | 12.04 | 12.04 | 12.04 | 12.04 |
| Polyester 1 | 81.97 | 79.27 | — | — | — | — |
| Polyester 2 | — | — | 79.98 | 79.98 | 79.98 | 79.98 |
| Hydroxy-Polymer | 4.32 | 6.89 | 6.96 | 6.96 | 6.96 | 6.96 |
| Catalyst | — | 0.1 | — | 0.1 | 0.1 | — |
| Additive | — | — | 0.5 | 0.5 | — | 0.5 |

Isocyanate is essentially pure 4,4'-phenylmethane diisocyanates (e.g. a certain amount of 2,4' isomer may be present, such as less than 2% by weight), which is solid at room temperature, has a functionality of 2, and an NCO content of 33.5 wt. %, commercially available from BASF Corporation.

Polyester 1 is a glycol adipate polyester polyol, having a functionality of 2 (i.e., it's difunctional), a hydroxyl number of 36-37, and a nominal molecular weight of 3,200, commercially available from COIM Group.

Polyester 2 is a solid, difunctional polyester based on 1,6 hexanediol adipate, having a hydroxyl number of from 27-33 and a nominal molecular weight of 3,740, commercially available from Polyurethane Corporation of America.

Hydroxy-polymer 100% solid copolymer comprising the reaction product of styrene, acrylate, and hydroxyethylacrylate, monomers, has a Tg of 70° C., a functionality of from 9-10, and a hydroxyl number of about 45, and is commercially available from BASF Corporation.

Catalyst is 2,2'-dimorpholinodiethylether (or "DMDEE") and is commercially available from BASF Corporation.

Additive is a silicone-free flow modifier, commercially available from Cytec Industries Inc. of Woodland Park, N.J.

The adhesives are formed by providing a reaction vessel (e.g. a 2 L flask), and charging the polyester and additive components into the vessel, if utilized. The vessel is pre-heated to 120° C. The hydroxy-polymer is then added to the vessel and the mass is stirred for 1 hour at 120° C. under an argon bleed. This allows for the components to fully liquefy and mix. The isocyanate is pre-molten and added rapidly to the vessel to react with the polyester and hydroxy-polymer. The reaction mass is then stirred for 1 hour at 120° C. under the argon bleed. The resulting adhesive is then transferred to one or more holding containers for subsequent analysis.

Physical properties of the various examples are illustrated in Table 2 below.

TABLE 2

| | Example | | | | | |
|---|---|---|---|---|---|---|
| | 1 | 2 | 3 | 4 | 5 | 6 |
| NCO Calc., % | 2 | 2 | 2 | 2 | 2 | 2 |
| NCO Actual, % | 1.9 | 1.8 | 1.9 | ~1.9 | ~1.9 | ~1.9 |
| Viscosity, 120° C. @ 0.3 rpm (cps) | 7,200 | 9,800 | — | — | — | — |
| Viscosity, 120° C. @ 0.6 rpm (cps) | 5,400 | 9,700 | — | — | — | — |
| Viscosity, 120° C. @ 10 rpm (cps) | — | — | 17,550 | ~17,550 | ~17,550 | ~17,550 |
| Open Time | Very Good | Very Good | Very Good | Very Good | Very Good | Very Good |
| Green Strength | Very Good | Very Good | Very Good | Very Good | Very Good | Very Good |

*Spindle #27 is utilized for all of viscosity measurements.

Example 3 is also used in substrate adhesion testing described in Tables 3A and 3B below.

TABLE 3A

| Run | Stile/Rail Type | Door Facing | Target = 0.2553 g | Press Time (sec.) |
|---|---|---|---|---|
| 1 | Wood | Grooved | 0.27 | 60 |
| 2 | Wood | Grooved | 0.29 | 60 |
| 3 | Wood | Grooved | 0.25 | 60 |
| 4 | Wood | Plain | 0.2 | 60 |
| 5 | Wood | Plain | 0.18 | 60 |
| 6 | Wood | Plain | 0.17 | 60 |
| 7 | Composite | Grooved | 0.37 | 60 |
| 8 | Composite | Grooved | 0.45 | 60 |
| 9 | Composite | Grooved | 0.31 | 60 |
| 10 | Composite | Plain | 0.38 | 60 |
| 11 | Composite | Plain | 0.37 | 60 |
| 12 | Composite | Plain | 0.29 | 60 |

TABLE 3B

| Run | Actual Time (sec.) | Load max. (lbs) | Load (psi) | Failure Type |
|---|---|---|---|---|
| 1 | 60 | 31.39 | 9.4 | Cohesive Substrate |
| 2 | 60 | 28.67 | 8.6 | Cohesive Substrate |
| 3 | 60 | 30.97 | 9.3 | Cohesive Substrate |
| 4 | 60 | 35.03 | 10.5 | Cohesive Substrate |
| 5 | 60 | 21.11 | 6.3 | Cohesive Substrate |
| 6 | 60 | 24.09 | 7.2 | Cohesive Substrate |
| 7 | 60 | 19.9 | 6 | Cohesive Substrate |
| 8 | 60 | 41.03 | 12.3 | Cohesive Substrate |
| 9 | 60 | 24.01 | 7.2 | Cohesive Substrate |
| 10 | 60 | 20.58 | 6.2 | Cohesive Substrate |
| 11 | 60 | 37.3 | 11.2 | Cohesive Substrate |
| 12 | 60 | 28.7 | 8.6 | Cohesive Substrate |

"Composite" in Tables 3A and 3B above is a lignocellulosic composite material, similar to fiberboard (e.g. medium density fiberboard or "MDF") which comprises lignocellulosic particles as well as glue, filler, and/or reinforcing agents. Therefore, it is expected that load maximums will generally be lower relative to load maximums of "pure" wood based on surface differences at the surface/adhesive interface. For example, certain wood-based composites can be prone to spalling, can require additional time for wetting out its surface, etc.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A hot melt adhesive which is solid at room temperature, said hot melt adhesive comprising the reaction product of:
   5 to 25% by weight of an isocyanate component having an NCO content of from about 20 to about 50% by weight;
   75 to 85% by weight of a polyester; and
   1 to 10% by weight of a hydroxy-polymer comprising the reaction product of a combination of monomers comprising at least one styrene monomer and at least one acrylate monomer, said hydroxy-polymer having an OH number of from about 40 to about 50.

2. The hot melt adhesive as set forth in claim 1, wherein said combination of monomers further comprises at least one hydroxyethylacrylate monomer different from said at least one acrylate monomer.

3. The hot melt adhesive as set forth in claim 1, wherein said hydroxy-polymer has a glass transition temperature (Tg) of from about 60° C. to about 80° C.

4. The hot melt adhesive as set forth in claim 1, wherein said hydroxy-polymer has a number average molecular weight (Mn) of from about 500 to about 15,000.

5. The hot melt adhesive as set forth in claim 1, wherein said polyester has a number average molecular weight (Mn) of less than about 4,000.

6. The hot melt adhesive as set forth in claim 1, comprising the reaction product of:

5 to 20% by weight of said isocyanate component;
76 to 84% by weight of said polyester; and
2 to 9% by weight of said hydroxy-polymer.

7. The hot melt adhesive as set forth in claim 6, comprising the reaction product of:
5 to 15% by weight of said isocyanate component;
77 to 83% by weight of said polyester; and
3 to 8% by weight of said hydroxy-polymer.

8. The hot melt adhesive as set forth in claim 1, wherein said hot melt adhesive has a residual NCO content of from about 1 to about 5% by weight.

9. The hot melt adhesive as set forth in claim 1, wherein said hot melt adhesive has a melt viscosity of from about 2,500 to about 75,000 centipoise (cps) at 120° C.

10. The hot melt adhesive as set forth in claim 1, wherein said hot melt adhesive has a tensile strength of from about 1,500 to about 4,000 pounds per square inch (psi) (or of from about 10 to about 28 megapascals (MPa)).

11. The hot melt adhesive as set forth in claim 1, wherein said hot melt adhesive has an elongation at break of from about 250 to about 750%.

12. An article comprising:
a first surface;
a second surface disposed adjacent said first surface; and
an adhesive layer disposed between said first and second surfaces such that said first and second surfaces are adhesively coupled by said adhesive layer;
said adhesive layer formed from a hot melt adhesive comprising the reaction product of;
5 to 25% by weight of an isocyanate component having an NCO content of from about 20 to about 50% by weight,
75 to 85% by weight of a polyester, and
1 to 10% by weight of a hydroxy-polymer comprising the reaction product of a combination of monomers comprising at least one styrene monomer and at least one acrylate monomer, said hydroxy-polymer having an OH number of from about 40 to about 50.

13. The article as set forth in claim 12, wherein:
i) said adhesive layer comprises the reaction product of said hot melt adhesive and water;
ii) each of said first and second surfaces comprises metal, wood, plastic, or combinations thereof; or
iii) both i) and ii).

14. A method for forming a hot melt adhesive which is solid at room temperature, said method comprising the steps of:
providing an isocyanate component having an NCO content of from about 20 to about 50% by weight;
providing a polyester;
providing a hydroxy-polymer comprising the reaction product of a combination of monomers comprising at least one styrene monomer and at least one acrylate monomer, the hydroxy-polymer having an OH number of from about 40 to about 50; and
combining the isocyanate component, the polyester, and the hydroxy-polymer to form the hot melt adhesive comprising 5 to 25% by weight of the isocyanate component, 75 to 85% by weight of the polyester, and 1 to 10% by weight of the hydroxy-polymer.

15. The method as set forth in claim 14, further comprising the step of heating the polyester and the isocyanate component until molten prior to the step of combining.

16. The method as set forth in claim 14, further comprising the step of providing a reaction vessel and wherein the step of combining is further defined as disposing the isocyanate component, the polyester, and the hydroxy-polymer in the reaction vessel to form the hot melt adhesive.

17. The method as set forth in claim 16, wherein the isocyanate component and the hydroxy-polymer are reacted in the vessel for a period of time to form a reaction intermediary prior to introducing the polyester to the vessel.

18. The method as set forth in claim 16, wherein the isocyanate component and the polyester are reacted in the vessel for a period of time to form a reaction intermediary prior to introducing the hydroxy-polymer to the vessel.

19. The method as set forth in claim 14, wherein the vessel is maintained at a temperature of from about 100° C. to about 130° C. for about 30 to about 180 minutes during formation of the hot melt adhesive.

* * * * *